United States Patent Office 2,859,243
Patented Nov. 4, 1958

2,859,243

BIS-MALEAMIC ACID

Ronald A. Reed, Quorn, England, assignor to Whiffen and Sons Limited, London, England No Drawing. Application August 6, 1956
Serial No. 602,428

6 Claims. (Cl. 260—534)

The present invention relates to new compositions of matter and process for making the same.

It has been found that the novel compound bis maleamic acid, its salts and derivatives, are of utility as chemical intermediates and for use as plant growth regulants and phytocides.

Accordingly the present invention is for the new compound bis maleamic acid, which is of the formula:

HOOC—CH=CH—CO—NH—NH
　　　　　　　　　　—CO—CH=CH—COOH and the derivatives of this compound including the salts, esters, amides thereof and like derivatives.

According to one embodiment of the invention the compound bis maleamic acid is prepared by the reaction of maleic anhydride, a weak organic acid and hydrazine, or a derivative of hydrazine, at a temperature below about 100° C., thereafter recovering the bis maleamic acid from the reaction mixture. The hydrazine may be used as hydrazine or as a derivative such as a salt, and is suitably in the form of hydrazine hydrate, or a salt of hydrazine with a weak organic acid. The reaction is preferably carried out under anhydrous conditions, although it may be carried out in the presence of water. The weak organic acid employed is suitably acetic acid, on account of cheapness and convenience. The derivatives of bis maleamic acid may be prepared by any methods known in the art for the preparation of derivatives of dicarboxylic acids.

The present invention also comprises plant growth regulants containing bis maleamic acid or a derivative thereof with a solvent and/or a carrier therefor with or without a wetting agent.

The new compounds may be incorporated with solid inert media comprising powdered or divided solid materials for example clays, sands, talc, mica, fertilizers and the like, such products either comprising dust or larger particle size materials.

Bis maleamic acid is substantially insoluble in water but a number of derivatives thereof such as the alkali metal or ammonium salts, are water soluble. In the case of the water soluble derivatives of bis maleamic acid, these may suitably be used as aqueous solutions with or without wetting or dispersing agents, organic solvents, stickers and the like which are commonly incorporated in agriculturally used sprays. Suitably a suspension of bis maleamic acid in water or a derivative may be solubilised by the addition of a material such as diethanolamine with or without a wetting agent.

Alternatively the bis maleamic acid or a derivative thereof may be dissolved in an organic solvent, and the resulting solution such or dispersed in water with or without the assistance of a wetting agent. Equally the bis maleamic acid or a derivative thereof may be admixed with a wetting agent or a non-solvent diluent to be used as such or to form a product which is dispersible in water. The bis maleamic acid or a derivative thereof may also be mixed with powdered or divided solid materials as referred to above together with a wetting agent so that a wettable product is obtained which is capable of use as such or as a suspension or dispersion in water.

The wetting agents used may comprise anionic, cationic or non-ionic wetting agents as are commonly known, and comprising for example aliphatic or aromatic sulphates or sulphonates such as cetyl potassium sulphate, sodium olelyl sulphate, sulphonated ethers, esters and amides, isopropyl naphthalene sodium sulphonate, dioctyl sodium sulphosuccinate and the like, or quaternary ammonium compounds or amines, amides and the like such as trimethyl cetyl ammonium iodide, cetyl pyridiniumbromide, olelyl amide and the like, or ethers or esters of polyhydric alcohols or polyhydric compounds.

The plant growth compositions according to the present invention may be used to control the growth of many forms of plant life. Thus for example the compositions sprayed on grass will retard the growth of the grass, without killing the grass.

The following examples are given to illustrate the process of the present invention. The parts by weight and parts by volume quoted bear the same relation to each other as do grams to millilitres.

Example 1

4.9 parts by weight of maleic anhydride were dissolved in 15 parts by volume of glacial acetic acid with heating to 70° C. The resulting solution was cooled and 1.25 parts by volume of hydrazine hydrate (100% w./v.) were added thereto with stirring and external cooling to maintain the temperature below 30° C. The yellow precipitate comprising bis maleamic acid which separates immediately, is filtered off and washed with alcohol and ether.

The bis maleamic acid melts with decomposition between 180° C. and 190° C., and combustion analysis has given the following results.

|  | Obtained, percent | Theory, percent |
|---|---|---|
| Carbon | 42.3; 42.7 | 42.1 |
| Hydrogen | 4.2; 4.0 | 3.5 |
| Nitrogen | 12.2; 12.0 | 12.3 |

Example 2

A composition for use as a plant growth regulant may be prepared by suspending 22.3 parts by weight of bis maleamic acid in 225 parts by volume of water and adding thereto 15 parts by volume of diethanolamine giving a clear solution of pH about 4. A wetting agent is suitably incorporated in this solution. This composition may be diluted to 8000 parts by volume to provide a solution suitable for spraying.

I claim:
1. Bis maleamic acid.
2. A process for the manufacture of bis maleamic acid consisting of reacting at a temperature below 100° C. of about two mols of maleic anhydride with about one mol of hydrazine in the presence of a weak carboxylic acid and thereafter recovering the bis maleamic acid from the reaction mixture.
3. A process as claimed in claim 2 wherein the reaction is carried out under anhydrous conditions.
4. A process as claimed in claim 2 wherein the carboxylic acid is acetic acid.
5. A process as claimed in claim 2 wherein the hydrazine is in the form of hydrazine hydrate.
6. A process as claimed in claim 2 wherein the hydrazine is in the form of a salt with an organic acid.

References Cited in the file of this patent

Feuer et al.: J. A. C. S., vol. 73, 4716–19 (1950).